(No Model.)
R. KNIETSCH.
PROCESS OF AND APPARATUS FOR MAKING LIQUID CHLORIN.
No. 506,639. Patented Oct. 10, 1893.
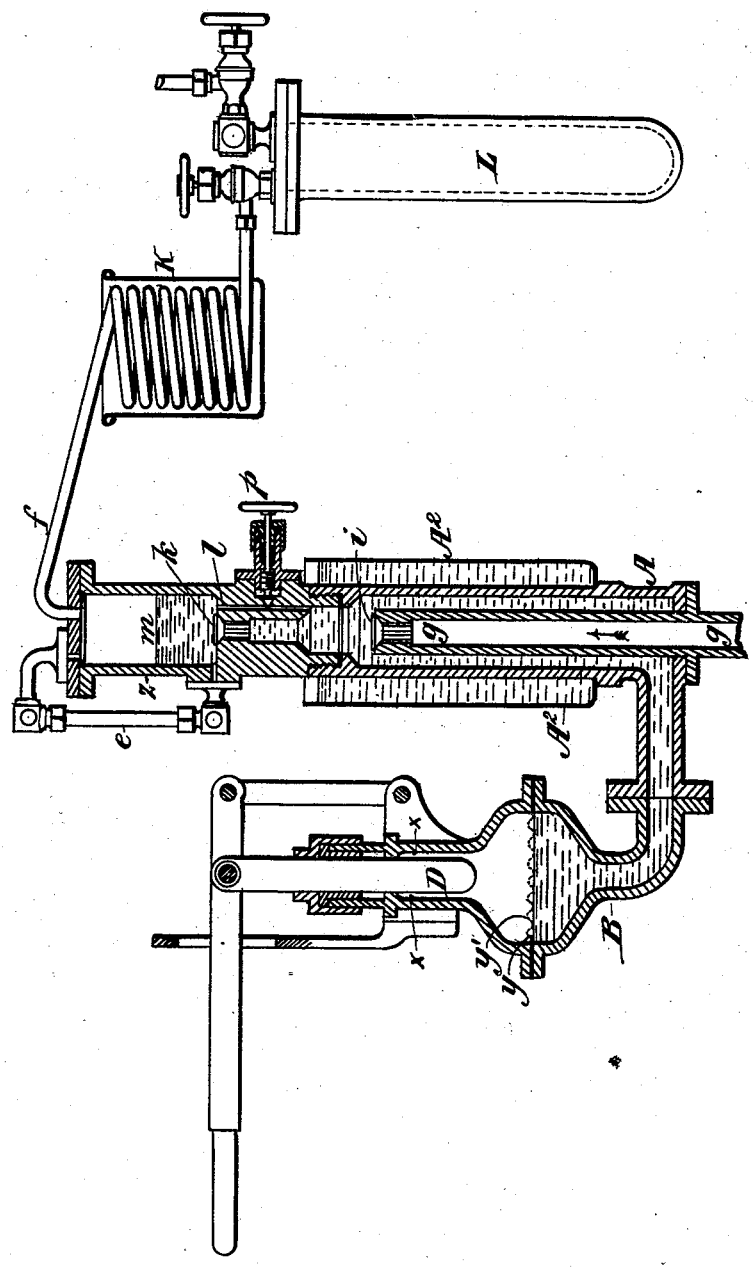
Witnesses.
Inventor.
Rudolph Knietsch.
By
Atty's.

UNITED STATES PATENT OFFICE.

RUDOLPH KNIETSCH, OF LUDWIGSHAFEN, ASSIGNOR TO THE BADISCHE ANILIN AND SODA FABRIK, OF MANNHEIM, GERMANY.

PROCESS OF AND APPARATUS FOR MAKING LIQUID CHLORINE.

SPECIFICATION forming part of Letters Patent No. 506,639, dated October 10, 1893.

Application filed June 5, 1890. Serial No. 354,412. (No model.) Patented in Germany August 7, 1888, No. 50,329; in France August 11, 1888, No. 192,353, and in England September 10, 1888, No. 13,070.

*To all whom it may concern:*

Be it known that I, RUDOLPH KNIETSCH, a subject of the King of Prussia, residing at Ludwigshafen-on-the-Rhine, in the Kingdom of Bavaria and Empire of Germany, have invented new and useful Improvements in and Relating to the Manufacture of Liquid Chlorine in a Form Suitable for Transport and Storage, (for which patents have been obtained in Germany, No. 50,329, dated August 7, 1888; in France, brevet No. 192,353, dated August 11, 1888, and in Great Britain, No. 13,070, dated September 10, 1888,) of which the following is a specification.

The object of this invention is the manufacture of chlorin in a liquid state.

The accompanying drawing represents an elevation partly in section of my improved apparatus. The description of this apparatus and its function will serve also to explain the improved process which forms part of my invention.

The apparatus consists of two vessels A and B charged with concentrated sulphuric acid and petroleum so that the sulfuric acid occupies the space between the lines $y$ and $z$ and the petroleum the space between the lines $y$ and $x$. The chlorin gas which must be thoroughly well dried is introduced through the pipe $g$ which extends into the vessel A and is provided with the lift valve $i$ and above this lift-valve is a passage leading into a chamber $m$ above and closed by a lift-valve $k$. The chamber $m$ is provided with a gage glass $e$. The vessel B is enlarged at the part $y$ where the sulfuric acid and the petroleum meet so as to diminish the perpendicular movement of the liquid and prevent the formation of an emulsion, or an elastic diaphragm, such for instance as a corrugated disk of sheet metal extensively used in pressure gages, may be inserted at this place as indicated by the dotted line $y'$. The upper part of the vessel B is furnished with a forcing device or plunger D, so that when the plunger is raised, the sulfuric acid contained in the space between the two valves $i$ and $k$ descends below the level of the inlet valve $i$ and the chlorin gas passes up through the pipe $g$ and fills the space between the valve $i$ and the valve $k$.

When the plunger D is forced down, the valve $i$ closes and as the sulfuric acid rises in the chamber A, the chlorin gas is forced through the valve $k$ into the chamber $m$, from which it passes through the pipe $f$ and the cooler K into the receiver L. As the chlorin gas is forced forward by the sulfuric acid in chamber A, it is forced through the warm sulfuric acid contained in chamber $m$ which acts to purify it and to hold back moisture and foreign substances with which it may be contaminated and which, unless held back, would tend to destroy the useful qualities of my product. The valve $k$ is depressed upon its seat by the expansive force of the liquid or fluid contained in the chamber $m$ and after a few strokes of the plunger D the pressure in the chamber retains said valve in its seat with the required force to insure the liquefaction of the chlorin gas. It is of advantage to maintain the vessel or chamber A at a temperature of from 50° to 100° centigrade during the operation and for this purpose a jacket $A^2$ is provided which can be charged with hot water or other heating medium. Should liquid or gaseous chlorin remain in the chamber A below the valve $k$ at the end of the depression of the plunger D, the said chlorin would on the pressure being relieved, expand and fill a large portion of the void otherwise produced by the use of the plunger D, thereby materially reducing the effect of the apparatus. To avoid this disadvantage I have provided a small passage $l$ controlled by a stop valve $p$ and made to extend from the chamber $m$ to the space between the valves $i$ and $k$. Whenever the pressure is relieved in this space, a small quantity of sulfuric acid passes through the passage $l$ from the chamber $m$ into the space above the valve $i$ and a somewhat smaller quantity of chlorin is drawn into this space than the quantity exactly corresponding to the displacement of the plunger D and consequently on the return stroke of the plunger not only all the chlorin is forced out but also a small quantity of sulfuric acid equivalent to that which previously passed down through the passage $l$. The valve $p$ is adjusted according to the level of the sulfuric acid in the chamber $m$. The chlorin gas collects above the sulfuric acid and remains in gaseous form as long as it is heated. As it passes from the chamber *m* into the cooler it becomes liquid.

I have found that cast iron, wrought iron, steel, phosphor-bronze, brass, copper, zinc and lead are not affected by my dry compressed chlorin. These metals are by preference used in the construction of my apparatus, and also of the receptacles for storing and transporting the liquid chlorin. For example the vessels A and B may be made of wrought iron, the receiver L of steel, the cooling worm or coil *k* of copper, the valves or cocks of phosphor-bronze, and lead, rubber or asbestus are employed for packing the flanges and the valve spindles. For storing or transporting the liquefied chlorin the vessels are preferably made partly of iron or steel, either lined with lead, copper or brass or not.

The movable parts of the apparatus which are in contact with the air may be protected from the action of the sulfuric acid by any suitable liquid with or without a diaphragm, but preferably by means of a mineral oil as hereinbefore explained, such as petroleum, ligroin or melted paraffin and vaseline, which are not subject to decomposition when brought into contact with sulfuric acid. These liquids must be carefully purified with concentrated sulfuric acid before being placed in contact with the sulfuric acid in the apparatus.

The chlorin may be liquefied without the employment of an intermediate liquid, the pressure being transmitted directly through the sulfuric acid, but this is done at the expense of the apparatus. Concentrated sulfuric acid acts successfully for the purpose of compressing acid liquefying the chlorin gas since it is not attacked by the chlorin gas. Thus is avoided the presence of moisture in the gas which would cause it to attack and destroy metals; thus also is avoided the contamination of the gas with hydro-chloric acid which would impair its value and greatly increase the pressure required for liquefying. For these reasons the employment of sulfuric acid as a medium for the application of the compression power is important to the product. I have also found, that cold sulfuric acid absorbs chlorin under pressure like water does carbonic acid, and on relieving the pressure the gas is released just as carbonic acid escapes from soda water on the release of pressure. This gas, at the back stroke of the piston would occupy the space below the valve to the exclusion of fresh gas. If the temperature of the sulfuric acid is maintained at from 50° to 100° centigrade, very little (if any) chlorin is absorbed by the acid during the operation of the apparatus, and very little (if any) hydro chloric acid is produced. It must further be remarked that I use mineral oil in combination with the sulfuric acid, because ordinary lubricating oil would be decomposed by contact with the acid and at the same time this mineral oil serves to keep those parts of the apparatus which are periodically exposed to the air altogether away from the sulfuric acid. Traces of sulfuric acid borne on said parts would absorb moisture and then attack the metals.

The liquid chlorin obtained by my process is of a brownish-yellow color and boils at a temperature of about minus thirty-two ($-32$) degrees centigrade (spirit thermometer) at a pressure of about seven hundred and fifty-six millimeters. Its specific gravity at that temperature is about 1.56 and at 0° centigrade it is about 1.47. At the temperature of 15° to 20°, the specific gravity is 1.43 to 1.41.

My process substantially excludes contamination. Water is excluded because it would be absorbed by the sulfuric acid in the machine. Air is excluded because the apparatus is hermetically closed. And impurities in the chlorin gas used, such as those which arise from the presence of organic matter in the manganese dioxid used, or moisture obtained from the hydrochloric acid used in preparing the chlorin, if present, would be held back by the warm sulfuric acid. Therefore, when practiced under the best conditions, my invention involves freedom from these contaminations. But I do not desire to limit myself strictly to absolute freedom from them, since it is possible that one or more of them may exist to some extent without incapacitating the product so far as concerns its practical capacity of being kept in metallic vessels.

The metals to which I refer as capable of containing my liquid chlorin are, principally, iron, copper, zinc, tin, or lead; but I should not consider it a departure from my invention if the liquid chlorin should be contaminated with a body affecting its relations with some but not all of these metals.

What I claim as new, and desire to secure by Letters Patent, is—

1. The process of producing liquid chlorin which consists in submitting a confined body of chlorin gas to pressure transmitted through a body of sulfuric acid, substantially as described.

2. The improvement in the process of producing liquid chlorin which consists in forcing chlorin gas through a body of sulfuric acid into a confined space, substantially as described.

3. The improvement in the process of producing liquid chlorin which consists in forcing chlorin gas through a body of sulfuric acid into a confined space by pressure transmitted through sulfuric acid, substantially as described.

4. The process of producing liquid chlorin which consists in submitting a confined body of chlorin gas to pressure transmitted through a body of heated sulfuric acid, substantially as described.

5. The process of producing liquid chlorin, which consists in submitting a confined body of chlorin gas to pressure transmitted through bodies of mineral oil and sulfuric acid, substantially as described.

6. The improvement in the process of liquefying chlorin which consists in submitting a confined body of chlorin gas to pressure transmitted through a body of sulfuric acid and cutting off the sulfuric acid from those parts of the apparatus which are exposed to the air by a suitable liquid such as petroleum, substantially as described.

7. In combination a vessel A provided with an escape passage, a lift valve $k$ on this passage, a pipe $g$ leading into the vessel A and provided with a lift valve $i$, the vessel $m$ above the valve $k$, a fluid containing pipe leading into the vessel A and a mechanical forcing apparatus communicating with the fluid containing pipe, substantially as described.

8. In combination a vessel A provided with an escape passage, a lift valve $k$ on this passage, a pipe $g$ leading into the vessel A and provided with a lift valve $i$, the vessel $m$ situated above the valve $k$ and provided with a passage $l$ leading into the vessel A, a valve $p$ for regulating the flow of the liquid through the passage $l$, a fluid containing pipe leading into the vessel A and a mechanical forcing apparatus communicating with this pipe, substantially as described.

9. In combination, a vessel A, provided with an escape passage, a lift valve $k$ on this passage, a pipe $g$ leading into the vessel A and provided with a lift valve $i$, a fluid containing vessel B communicating with the vessel A, a movable diaphragm $y$ in the vessel B and means substantially as described for forcing the liquid from the vessel B into the vessel A.

10. In combination, a vessel A, means substantially as described for heating said vessel and for exposing the chlorin gas to pressure, a second vessel $m$ into which the compressed chlorin gas is driven from the vessel A, a refrigerator communicating with the interior of the vessel $m$ and a receiver communicating with the refrigerator, substantially as described.

In testimony whereof I have hereunto set my hand in the presence of two subscribing witnesses.

RUDOLPH KNIETSCH.

Witnesses:
ERNEST F. EHRHARDT,
HERMANN HAUG.